United States Patent
Kubokawa (10) Patent No.: US 7,169,202 B2
(45) Date of Patent: Jan. 30, 2007

(54) FILTER ASSEMBLY

(75) Inventor: James O. Kubokawa, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 263 days.

(21) Appl. No.: 10/745,191

(22) Filed: Dec. 24, 2003

(65) Prior Publication Data

US 2005/0138905 A1    Jun. 30, 2005

(51) Int. Cl.
  *B01D 46/10*  (2006.01)
  *B01D 46/52*  (2006.01)

(52) U.S. Cl. .......................... 55/495; 55/487; 55/497; 55/499; 55/500; 55/501; 55/503; 55/521; 55/527; 55/DIG. 31

(58) Field of Classification Search ................. 55/495, 55/497, 499, 500, 501, 502, 503, 521, 385.1, 55/DIG. 31, 487, 527
See application file for complete search history.

(56) References Cited

U.S. PATENT DOCUMENTS

| | | | |
|---|---|---|---|
| 2,074,294 A * | 3/1937 | Woodruff .................... | 55/499 |
| 2,130,107 A | 9/1938 | Somers | |
| 2,423,741 A | 7/1947 | Vokes et al. | |
| 3,183,286 A | 5/1965 | Harms | |
| 3,187,489 A | 6/1965 | Bauder et al. | |
| 3,280,984 A | 10/1966 | Sexton et al. | |
| 3,373,546 A | 3/1968 | Setnan | |
| 3,494,113 A | 2/1970 | Kinney | |
| 3,624,161 A | 11/1971 | Bub | |
| 3,712,033 A | 1/1973 | Gronholz | |
| 3,774,377 A | 11/1973 | Bishop | |
| 3,789,589 A | 2/1974 | Delany et al. | |
| 4,042,358 A | 8/1977 | Frohmader | |
| 4,135,900 A | 1/1979 | Westlin et al. | |
| 4,363,643 A * | 12/1982 | Elbrader et al. .............. | 55/499 |
| 4,549,887 A | 10/1985 | Joannou | |
| 4,617,122 A | 10/1986 | Kruse et al. | |
| 4,701,196 A | 10/1987 | Delany | |
| 4,756,728 A | 7/1988 | Conrad | |
| 4,762,053 A | 8/1988 | Wolfert | |
| 4,976,857 A * | 12/1990 | Solomon .................... | 55/521 |
| 4,978,375 A | 12/1990 | Il Yoo | |
| 4,999,038 A | 3/1991 | Lundberg | |
| 5,015,377 A | 5/1991 | Silvera | |
| 5,059,218 A | 10/1991 | Pick | |
| 5,075,000 A | 12/1991 | Bernard et al. | |
| 5,108,470 A | 4/1992 | Pick | |

(Continued)

FOREIGN PATENT DOCUMENTS

CA    1011265    5/1977

(Continued)

*Primary Examiner*—Jason M. Greene
(74) *Attorney, Agent, or Firm*—David B. Patchett (57) ABSTRACT

A filter assembly includes a reusable filter frame and a replaceable, pleated, reversibly expandable, self-spacing filter removably arranged in the frame. The self-spacing pleated filter expands uniformly with equal pleat spacing to allow the filter to be easily installed in the reusable filter frame without the aid of a secondary spacing structure. When the filter is expanded to the length of the filter frame, the filter is under tension, thereby allowing the length of the filter to be readily adjusted to match the length of the frame and allowing the pleats to be aligned with corresponding ribs provided in the frame.

24 Claims, 4 Drawing Sheets

U.S. PATENT DOCUMENTS

| | | | |
|---|---|---|---|
| 5,217,513 A | 6/1993 | Armbruster |
| 5,240,479 A | 8/1993 | Bachinski |
| 5,252,111 A | 10/1993 | Spencer et al. |
| 5,273,563 A | 12/1993 | Pasch et al. |
| 5,273,564 A | 12/1993 | Hill |
| 5,399,180 A | 3/1995 | Kopp |
| 5,464,461 A | 11/1995 | Whitson et al. |
| 5,505,852 A | 4/1996 | van Rossen |
| 5,571,300 A | 11/1996 | Stemmer |
| 5,595,107 A | 1/1997 | Bivens |
| 5,613,991 A | 3/1997 | Esaki et al. |
| 5,618,324 A | 4/1997 | Sommer et al. |
| 5,639,287 A | 6/1997 | Van de Graaf et al. |
| 5,743,927 A | 4/1998 | Osendorf |
| 5,779,747 A | 7/1998 | Schlör et al. |
| 5,792,228 A | 8/1998 | Fath et al. |
| 5,809,800 A | 9/1998 | Deal |
| 5,814,219 A | 9/1998 | Friedmann et al. |
| 5,820,644 A | 10/1998 | Mori et al. |
| 5,840,094 A | 11/1998 | Osendorf et al. |
| 5,846,302 A | 12/1998 | Putro |
| 5,958,097 A | 9/1999 | Schlör et al. |
| 5,968,217 A | 10/1999 | Stein et al. |
| 6,030,427 A | 2/2000 | Sorice et al. | |
| 6,033,453 A * | 3/2000 | Weddell, III | 55/497 |
| 6,059,852 A | 5/2000 | Olson | |
| 6,120,633 A | 9/2000 | LeMaster | |
| 6,179,891 B1 | 1/2001 | Knudsen et al. | |
| 6,228,152 B1 | 5/2001 | Guérin et al. | |
| 6,315,130 B1 * | 11/2001 | Olsen | 55/521 |
| 6,328,778 B1 | 12/2001 | Richerson et al. | |
| 6,740,136 B2 * | 5/2004 | Duffy | 55/497 |
| 6,740,137 B2 * | 5/2004 | Kubokawa et al. | 55/521 |
| 6,843,820 B2 * | 1/2005 | Kubokawa | 55/495 |
| 6,860,916 B2 * | 3/2005 | Kubokawa et al. | 55/495 |
| 6,955,702 B2 * | 10/2005 | Kubokawa et al. | 55/499 |
| 2003/0230061 A1 * | 12/2003 | Kubokawa et al. | 55/521 |
| 2003/0230062 A1 * | 12/2003 | Kubokawa et al. | 55/497 |
| 2003/0230063 A1 * | 12/2003 | Kubokawa et al. | 55/497 |

FOREIGN PATENT DOCUMENTS

| | | |
|---|---|---|
| CA | 1073826 | 3/1980 |
| JP | 4-131112 | 5/1992 |
| JP | 9-287811 | 11/1997 |
| JP | 10-156121 | 6/1998 |
| WO | WO 99/43413 | 2/1999 |

* cited by examiner

FILTER ASSEMBLY

FIELD

The present invention relates generally to filters and, more particularly, to a removable filter insert that is inserted into a reusable frame.

BACKGROUND

Many conventional residential heating and cooling systems include a disposable filter. These filters include a frame, a fibrous filter material, and a mesh screen or the like that supports the filter material. After a period of use, these filters become dirty or clogged and must be replaced. This is accomplished by replacing the entire filter assembly with a new filter and discarding the old one. Depending on the use of the filter, replacement may be required several times a year. Because the frame and screen are discarded with the assembly even though it is only the filter material that is no longer functional, there is unnecessary waste and cost associated with such filters. In addition, because these filters are rather bulky, they are often purchased as they are needed rather than keeping a large supply on hand. Because purchasing a new filter is not always convenient, replacement can be delayed resulting in reduced system performance.

Conventional filters are typically formed from a soft, limp, flexible material that lacks sufficient structural integrity to counteract an applied force. As a result, such filters, when pleated, do not significantly recover after being expanded and do not significantly expand after being collapsed. In addition, such filters do not expand with uniform pleat spacing. Consequently, if one attempts to install such a pleated filter in a frame having ribs designed to mate with the pleats and thereby maintain equal spacing and provide additional support for the filter, it is difficult to match the pleats of the filter with the ribs. Such filters must therefore include a secondary support structure to ensure uniform spacing of the pleats during the installation process. Such support structures, however, add to the material and manufacturing cost of such filters.

Filter assemblies with frames and removable filter elements are known in the prior art. U.S. Pat. No. 6,033,453 (Weddell, III), for example, discloses a reusable frame support rack for supporting and retaining an outstretched, replaceable pleated media filter core. The frame includes a pair of longitudinal angles extending between a pair of transverse angles which carry a flat expanded metal support or reinforcement system.

SUMMARY

Previous filters assemblies, however, suffer from certain limitations and drawbacks. There exists a need, therefore, for a filter assembly including a frame and a self-spacing pleated air filter insert without a secondary support structure that can be readily expanded to fit in the reusable filter frame, whereby the filter, when expanded, has uniform spacing and desirable cross-web stability.

It would therefore be desirable to provide a filter assembly including a frame and a self-spacing, reversibly collapsible and expandable, pleated air filter that does not include a secondary support structure, has uniform spacing and cross-web stability when expanded and inserted into a reusable filter frame, and can be collapsed for compact shipping, storage, and disposal.

The present invention provides a filter assembly comprising a filter frame, and a pleated, reversibly expandable, self-spacing filter removably arranged in the filter frame, the filter comprising filter media having a plurality of pleats each including a fold line defining a pleat tip and a pair of adjacent panels.

In one embodiment, the filter frame includes a base and a cover movably connected with the base. The base and cover may include corresponding first and second sides edges that are hingably connected. The base and cover first sides edges may be movable between a closed position wherein the first side edges are engaged to enclose the filter in the frame and an open position wherein the first side edges are displaced to allow the filter to be inserted into the frame.

In a specific embodiment, the base includes a plurality of transverse ribs corresponding to the pleats in the filter media which mesh between the pleats in the filter media. In one embodiment, the ribs are equally spaced.

In another aspect of the invention, the base may include at least one longitudinal rail including spacer portions corresponding to the shape of the filter pleats in the region of each rib. In one embodiment, the longitudinal rail and the ribs are provided in the form of a unitary grid structure.

In another aspect, the frame includes a securing mechanism arranged to retain the ends of the filter in the frame. The securing mechanism may comprise projections on the base that mate with corresponding holes in the cover.

In a specific embodiment, the filter assembly comprises a filter frame including a base having a plurality of transverse spacing ribs and a cover movably connected with the base, and a replaceable self-spacing filter removably arranged in the filter frame having a plurality of pleats adapted to mesh with the ribs. In an additional aspect, the number of pleat openings in one face of the filter media corresponds to the number of ribs, and the filter can be expanded and placed into the filter frame such that the pleat openings mesh with the ribs.

In another aspect, the invention provides an air filter assembly for a residential HVAC system including a replaceable, self-spacing, pleated, filter insert that can be easily installed in a reusable filter frame without the aid of a secondary spacing structure that would otherwise be attached to the filter insert. The filter insert comprises a reversibly collapsible and expandable filter media including a plurality of pleats, each pleat being defined by a fold line that defines a pleat tip and a pair of adjacent panels. When the filter is expanded to the length of the filter frame, the filter is under tension, and when the filter is expanded to a length greater than the length of the filter frame, the filter will behave like a spring and will exhibit some degree of elastic recovery.

In another aspect, the invention provides a filter assembly including a replaceable, self-spacing, pleated filter insert comprising reversibly collapsible and expandable filter media including a plurality of pleats, each pleat including a fold line defining a pleat tip and a pair of adjacent panels, wherein the filter has a fully expanded length, and wherein when the filter insert is expanded to greater than 80% of the fully expanded length, the filter insert will be under tension such that when the filter insert is released, the filter insert will return to a length that is less than the fully expanded length.

In another aspect, when the filter insert is arranged vertically and extended to its fully expanded length and released, the filter insert returns to a length that is no greater than 80% of the fully expanded length. In another aspect, when the filter insert is collapsed to its fully collapsed length and thereafter allowed to expand freely, the filter insert expands to a length 400% greater than fully collapsed length.

In a specific aspect, the filter is an air filter for a residential HVAC system constructed from a fibrous nonwoven media formed of a thermoplastic polymer such as polypropylene. In another aspect, the filter pleats are formed by heat setting. In other aspects, the filter media may have one or more of the following characteristics: a basis weight of 50–80 grams per square meter ($g/m^2$), a permeability of 690–1024 cubic feet per minute (cfm), and a thickness of 0.5 to 0.63 millimeters (mm). In yet another aspect, the filter may include attachment members along opposed first and second ends of the media to facilitate securing the filter to the frame.

Advantages of various aspects of the invention include elimination of a secondary spacing structure, thereby reducing material costs and simplifying the manufacturing process, providing a filter that is under tension and behaves like a spring when expanded to the length of the filter frame into which it is to be installed, thereby allowing the length of the filter to be readily adjusted to match to length of the frame and allowing the pleats to be aligned with corresponding ribs provided in the frame, and providing a pleated filter that expands uniformly and evenly with sufficient cross-web stability to prevent folding or collapsing of the filter in the cross-web (i.e. transverse) direction during the installation process, thereby improving handling and installation of the filter insert into a frame.

BRIEF DESCRIPTION OF THE DRAWINGS

The present invention will be further described with reference to the accompanying drawings, in which.

DETAILED DESCRIPTION

Referring now to the drawings, wherein like reference numerals refer to like or corresponding parts throughout the several views, FIGS. 1–5 show a reusable filter frame 2 including a base 4 and an optional cover 6 for use with a removable, self-spacing, pleated filter 8 having an appropriate size and configuration to fit into the base 4. Alternatively, the function of the base 4 and cover 6 may be reversed so that the filter 8 is arranged in the cover 6 and the base 4 is closed with the cover 6. The filter frame 2 has a generally planar rectangular configuration and is particularly suited for use in an air duct or furnace of a residential air handling system.

The filter 8 generally includes filter media 10 having a plurality of pleats 12. The filter 8 is described more fully below with reference to FIGS. 6–9.

The base 4 and cover 6 include perimeter structures 4a, 6a, respectively, having corresponding first ends 16, 18 and second ends 20, 22, respectively, and first sides 24, 26 and second sides 28, 30, respectively. A plurality of equally spaced transverse ribs 32 extend from the first side 24 of the base 4 to the second side 28 of the base 4 and mesh with the expanded pleats 12 to provide additional support for the filter media 10 and maintain uniform spacing of the pleats 12 after installation and during use. To provide complete and uniform spacing of each pleat 12, it is desirable that the ribs 32 be continuous across the entire width of the base 4, other than discontinuities that may be required as part of the molding process, and have a uniform height. In addition, the number of ribs 32 preferably corresponds to the number of pleats 12 on the downstream side of the filter 8 so that one rib 32 is arranged in each downstream pleat opening. The ribs 32 may be molded with the perimeter structure 4a of the base 4 or they may be provided as wires, dowels, or other members that are attached to the perimeter structure 4a of the base 4.

The base 4 also optionally includes a plurality of longitudinal rails 34 extending from the first end 16 to the second end 20 that combine with the transverse ribs 32 to form a grid structure. The ribs 32 and rails 34 can be formed as separate structures or as a unitary structure. The rails 34 are shown with optional triangularly-shaped spacer portions 34a (FIG. 2) that generally follow the contour of the filter pleats 12, thereby maintaining the spaced structure of the pleats 12. Each spacer portion 34a includes a base 36 along the rail 34 and an apex 37 (FIG. 5) adjacent a corresponding rib 32. The ribs 32 and rails 34 are preferably formed of a synthetic plastic material such as ABS (acrylonitrile butadiene styrene) or HIPS (high impact polystyrene) but may also be formed of other conventional materials such as wire or flat metal fins.

The cover 6 contains a central opening 38 that allows air to flow through the frame 2 to the filter 8 so that contaminants can be removed from the air stream. The cover 6 engages the periphery of the base 4 to securely retain the filter 8 in the frame 2 and to prevent air from flowing around the filter 8. The base 4 and cover 6 are pivotally connected along their associated second sides 28, 30, respectively, via hinge members 40 (FIG. 4) in the form of flexible straps. In this manner, the frame 2 is movable between an open condition (FIG. 1) wherein the base 4 and cover 6 first side edges 24, 26, respectively, are displaced to allow the filter 8 to be installed in or removed from the frame 2, and a closed condition (FIG. 4) wherein the base 4 and cover 6 first side edges 24, 26 respectively, are engaged to enclose the filter 8 in the frame 2. It will be recognized that any conventional hinge may be used to connect the base 4 with the cover 6. Alternatively, the frame 2 may have a single-piece unitary construction wherein the base 4 and cover 6 are joined by a living hinge, formed, for example, by injection molding. It will be recognized that the base 4 and cover 6 may also be formed as two separate pieces that snap together or otherwise interlock.

A pair of optional latches 42 (FIG. 4) each including a flexible cantilevered bar member 44 (FIG. 1) that snap fits over an aligned protrusion 46 (FIG. 1) are provided to maintain the frame 2 in its closed condition. Other conventional closures or mechanical fasteners such as hook and loop, elastic bands, locks, or the like may also be used.

The cover 6 may also optionally include transverse and/or longitudinal support bars (not shown) similar to those provided in the base 4 that serve to further retain the filter media 10 in the frame. Such support bars would prevent the filter media 10 from ballooning out of the frame in case the frame is inadvertently inserted backward in an air duct. When inserted backward, the filter will not perform properly because the pleats are not supported by the ribs 32 and will therefore tend to collapse in use, but the filter media will be retained in the frame 2 so that any damage to the system is avoided.

To ensure that the frame 2 is installed correctly in the air duct with the cover 6 upstream and the base 4 downstream so that air travels successively through the cover 6, the filter 8, and the base 4, a visual indicator 47 is provided on the frame 2 showing the proper orientation of the frame relative to the direction of the air flow. Additional instructions may be provided to ensure the frame is properly oriented in the air duct.

Protrusions 48 provided in the first 16 and second 20 ends of the base 4 serve as securing mechanisms to attach the filter 8 to the base 4 when the filter 8 is installed in the frame 2. Each protrusion 48 engages an aligned hole 50 contained in the first 18 and second 22 ends of the cover 6. Other suitable securing mechanisms include adhesive, hook and loop fasteners, clips, clamps, clasps, hooks, or the like. Alternatively, the filter 8 may be secured in the frame 2 by simply capturing or pinching the ends of the filter between the base 4 and the cover 6.

The frame 2 is generally intended as a frame for a residential air filter for use in, for example, a furnace, an air return duct, a window air conditioning unit, or a kitchen range hood. Accordingly, the frame 2 generally has a depth or thickness of ½ inch to 5 inches, preferably between ¾ inch to 1¼ inches, and more preferably approximately an inch thick. The height of the frame 2 is generally between 5 inches and 24 inches, and preferably between 10 inches and 20 inches. The width of the frame is generally between 10 inches and 40 inches, and preferably between 20 inches and 30 inches.

To facilitate installation and removal of the frame 2 from an air duct, indentations 52 are provided in the ends 16, 20 of the base 4 and side 26 of the cover 6. The indentations provide a narrow gripping region along the periphery of the frame that can be readily grasped by a user during the installation and removal process.

Referring now to FIGS. 6–9, there is shown in greater detail the replaceable, self-spacing, pleated filter insert 8 adapted for placement in the filter frame 2. "Self-spacing" refers generally to the ability of the filter insert 8 to be readily expanded and arranged in the frame 2 having equally spaced transverse ribs 32 without the aid of a secondary spacing structure. In certain aspects, it may also refer to the ability of the filter to expand uniformly, or the tendency of the filter to expand from its fully collapsed state. Uniform spacing of the pleats refers to the pleats expanding in a generally even fashion, whereby the distance between adjacent pleat tips is generally equal and constant along the entire length of the expanded filter. In another aspect of the invention, "self-spacing" refers to a pleated filter that expands to at least 500% of its fully collapsed length when permitted to expand freely.

Figures 6, 7, 8, 9:
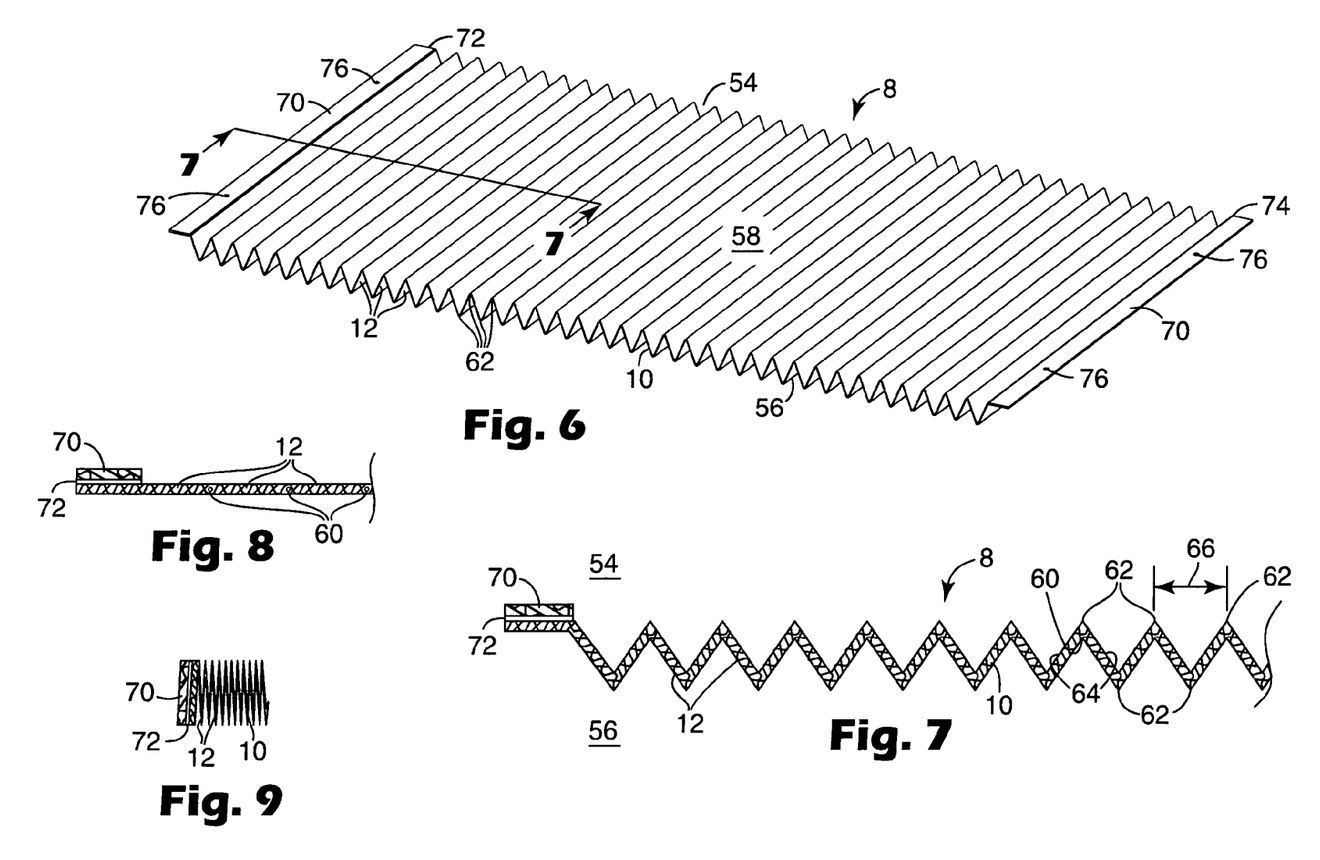
FIG. 6 is a perspective view of the filter in its partially expanded condition.
FIG. 7 is a sectional view taken along line 7—7 of FIG. 6.
FIG. 8 is a side sectional view of the filter in its fully expanded condition.
FIG. 9 is a side sectional view of the filter in its fully collapsed condition.

The filter 8 includes reversibly expandable and collapsible pleated filter media 10 having an inlet face 54 and an outlet face 56. The filter may be constructed from a self-supporting media, which would allow the filter to be used with a filter frame that does not include ribs 32. The reversibly expandable and collapsible construction allows the filter 8 to be collapsed to a compact form for shipping and storage and to later be expanded to an appropriate length for placement in and attachment to the frame 2. This construction also ensures reliable uniform down web spacing and cross-web stability, which aid handling and installation of the filter 8.

The media 10 includes a plurality of pleats 12 each including a fold line 60 defining a pleat tip 62 and a pair of adjacent panels 64. The spacing distance 66 between successive pleat tips 62 depends of the size of the filter but generally ranges from about 2 millimeters to about 40 millimeters. For most applications, however, the spacing distance 66 between successive pleat tips 62 is preferably at least 5 millimeters and, more preferably, at least 8 millimeters. Pleat depth and the thickness of the filter 10 is typically about 1 centimeter to about 10 centimeters (0.4 inches to 4 inches). For HVAC applications, the length and width of the filter 10 is typically 30.5 centimeters×30.5 centimeters (12 inches×12 inches) to about 50.8 centimeters×76.2 centimeters (20 inches×30 inches).

Optional elongate attachment members 70 are provided along opposite ends 72, 74 of the filter 8 parallel to the fold lines 60. The attachment members 70 preferably have a stiffness greater than the stiffness of the filter media 10. The attachment members 70 provide the ends 72, 74 of the filter 8 with increased stiffness, thereby improving the handlability of the filter 8 and allowing the filter 8 to be expanded more easily and uniformly. In addition, the attachment members 70 provide the ends 72, 74 with increased strength and rigidity so that the filter 8 can be quickly and easily attached to the base 4 of the frame 2.

Optional holes 76 that mate with protrusions 48 (FIG. 1) are provided in the attachment members 70 and serve to attach the filter 8 to the base 4 and maintain the filter 8 in its expanded condition when the filter 8 is placed in the base 4. To ensure the filter 8 is properly oriented in the frame 2 during installation, the holes 76 and corresponding protrusions 48 may be provided in an asymmetric pattern that allows the filter 8 to be attached to the frame 2 in only one orientation. Other conventional means for attaching the filter 8 to the frame 2 such as pinching the attachment members 70 between the base 4 and cover 6, hook and loop fasteners, adhesive, clips, clamps or the like may also be used. The attachment members 70 may be formed of any suitable material including metal foils, paperboard, cardboard, chipboard, synthetic plastic materials including plastic film, or multiple layers of filter media folded over and laminated together.

The filter media 10 used to construct the filter insert 8 is relatively stiff and preferably self-supporting, and may also be electrostatically charged. By "self-supporting" it is meant that the media generally maintains its shape when subjected to an air stream. Thus, whether the media is self-supporting depends on the physical properties of the media itself, the geometry or construction of the media, and the conditions to which the media is subjected in a particular end use application.

Generally, media having a Gurley stiffness of greater than 50 milligrams for a sample size having a width of 2 inches and a length of 1.5 inches and, more specifically, having a Gurley stiffness of greater than 100 milligrams for such a sample size would be self-supporting for typical residential applications. For media having stiffness values less than this value, whether the media is self-supporting depends on the construction of the media and on the end use application. If the media is self-supporting, the support ribs 32 (FIGS. 1 and 2) are not be required because the media will maintain its shape when subjected to the air stream. Even if the filter media is self-supporting, however, support ribs 32 are preferably provided to improve the stability and overall performance of the filter.

In accordance with a characterizing feature of the pleated filter insert 8, when it is expanded to the length of the frame 2, the filter insert 8 is under tension. That is, the pleated structure will tend to draw the pleats together, thereby causing the filter to return to a shorter length. In accordance with another aspect of the invention, when the filter insert 8 is expanded to a length that is greater than approximately 80% of its fully expanded length (as illustrated in FIG. 8), the filter insert 8 will be under tension such that when the filter insert is released and allowed to return to its equilibrium length, the filter will return to a length that is less than its fully expanded length, and preferably to a length that is less than the length of the frame 2.

As shown in FIG. 8, the filter insert's fully expanded length is the length produced when the filter insert 8 is expanded such that the pleats are generally coplanar and the filter insert takes the form of a generally flat sheet. Attempting to expand the filter insert 8 beyond its fully expanded length will place the filter media 10 itself under tension and will ultimately cause the media to tear or rupture.

Thus, when the filter insert 8 is expanded to a length that is greater than the length of the filter frame 2, the filter insert 8 will exhibit some degree of elastic recovery and will tend to recoil to a length that is less than the length of the filter frame 2. That is, the filter insert 8 will behave like a weak spring. The construction of the filter insert 8 also allows it to expand evenly and uniformly. In addition, the filter insert 8 has sufficient cross-web stability to prevent the filter insert 8 from folding or collapsing transversely. These characteristics facilitate installation of the filter insert 8 into the frame 2 by allowing a user to gently move the ends of the filter insert 8 apart or together to match the length of the frame 2, and by allowing the user to feed the pleats into the spacing ribs 32 of the frame, if present.

In another aspect, when the filter insert 8 is arranged vertically and extended to its fully expanded length and released, the filter insert 8 will return to a length that is no greater than 80% of the fully expanded length. And when the filter insert 8 is collapsed to its fully collapsed length (as illustrated in FIG. 9) and then allowed to expand freely, the filter insert 8 will expand to a length that is 400% greater than the fully collapsed length. In its fully collapsed condition, adjacent pleats of the filter insert 8 lie face to face in fully contacting and overlapping relation.

The particular filter media selected for the filter insert 8 is not critical to the invention hereof, so long as it can be used to produce a filter insert having the desired characteristics when pleated. The filter insert 8 may be constructed, for example, from nonwoven fibrous media formed of thermoplastics or thermosetting materials such as polypropylene, linear polyethylene, and polyvinyl chloride. The filter insert 8 generally has a basis weight of 50 to 80 g/m$^2$, a tensile strength of 57 to 95 lbs (253 to 423N), a tensile elongation of greater than 60%, a thickness of 0.5 to 0.6 mm, a pore size of greater than 212 microns. In addition, to produce a pleated filter having the desired springiness, the pleats may be formed by heat setting. Heat setting was found to increase the tension or tightness of the pleated structure of the filter insert 8, which may be desirable when using certain media.

A suitable filter insert 8 may be constructed, for example, using BBS Melfab 80 media, a fibrous polypropylene nonwoven media available from Terram Limited, Gwent, United Kingdom. The filter insert 8 may be produced by pleating the Melfab 80 media and then heat setting the pleats. Forming the pleats by heat setting may be accomplished using a Rabofsky pleater with a 200° F. heat set platen temperature. Forming the pleats in this media by heat setting produced a filter insert having the desired characteristics. That is, the filter insert 8 was self-spacing and had the desired springiness such when the filter insert 8 was expanded to the length of the filter frame 2, the filter insert 8 was under tension. Thus, when the filter insert 8 was expanded to a length greater than the length of the filter frame 2, the filter insert 8 exhibited elastic recovery and therefore tended to recoil to a length less than the length of the filter frame 2.

Melfab 80 is nonwoven fibrous media formed of polypropylene fibers. The media has a thickness of approximately 0.63 mm, a basis weight of 80 g/m$^2$, and a permeability of 690 cfm. The pleated filter insert had a pressure drop of 0.13" W.G. at a face velocity of 300 fpm, and a pressure drop of 0.28 W.G. at a face velocity of 500 fpm.

Figure 1:
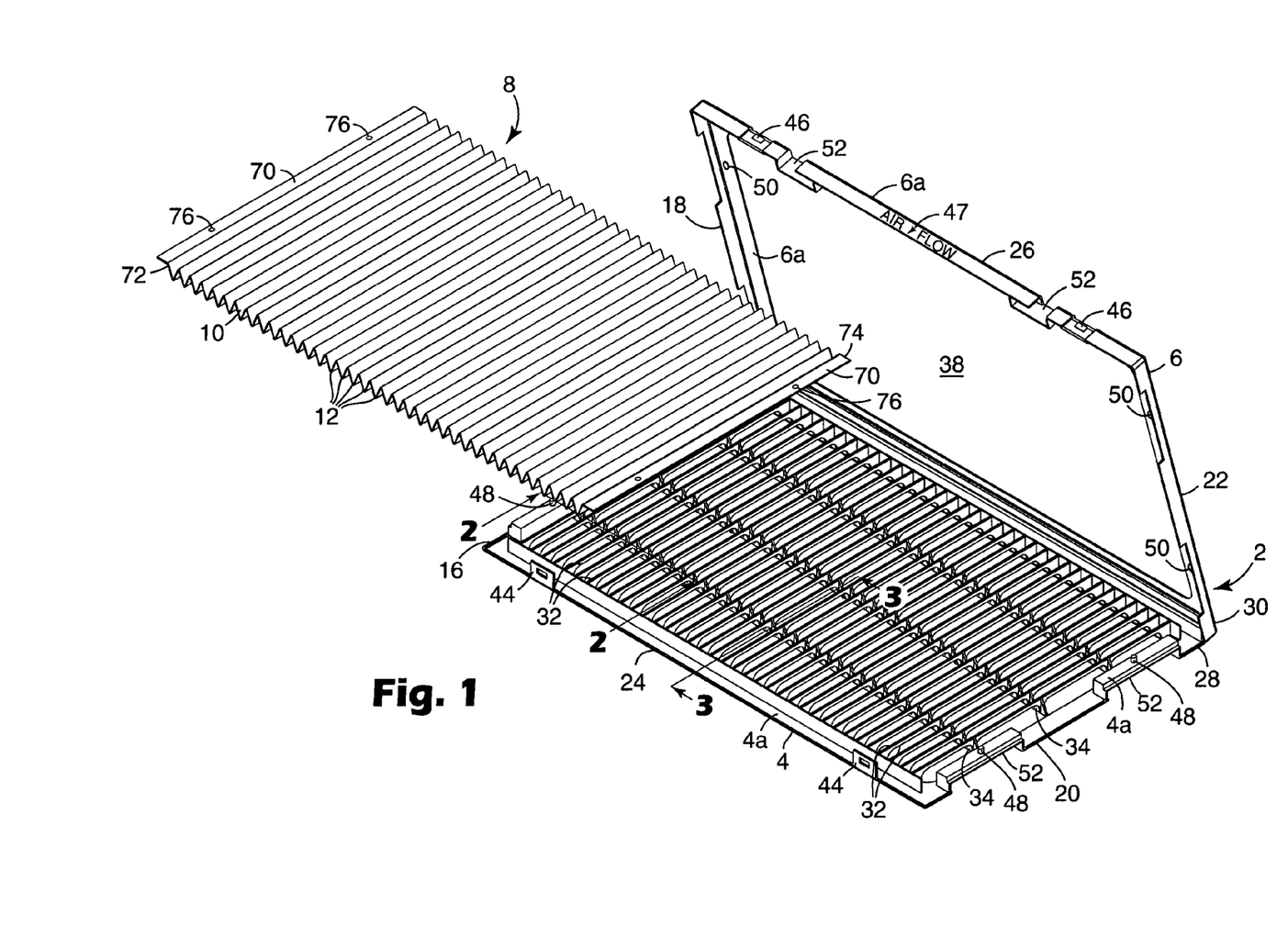
FIG. 1 is a perspective view showing a reusable filter frame with a replaceable filter insert according to the invention.
Figure 2:
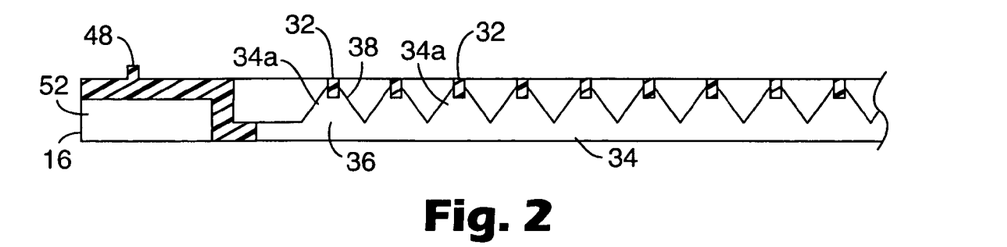
FIG. 2 is a sectional view taken along line 2—2 of FIG. 1.
Figure 3:
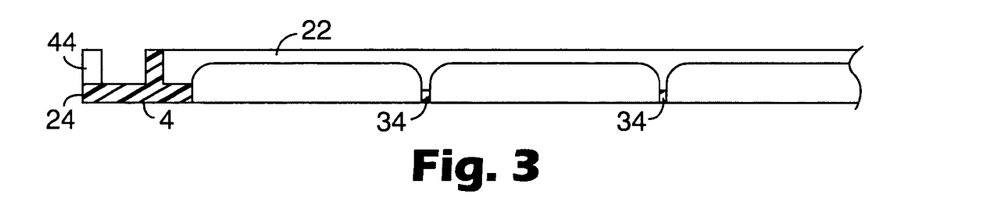
FIG. 3 is a sectional view taken along line 3—3 of FIG. 1.
Figure 4:
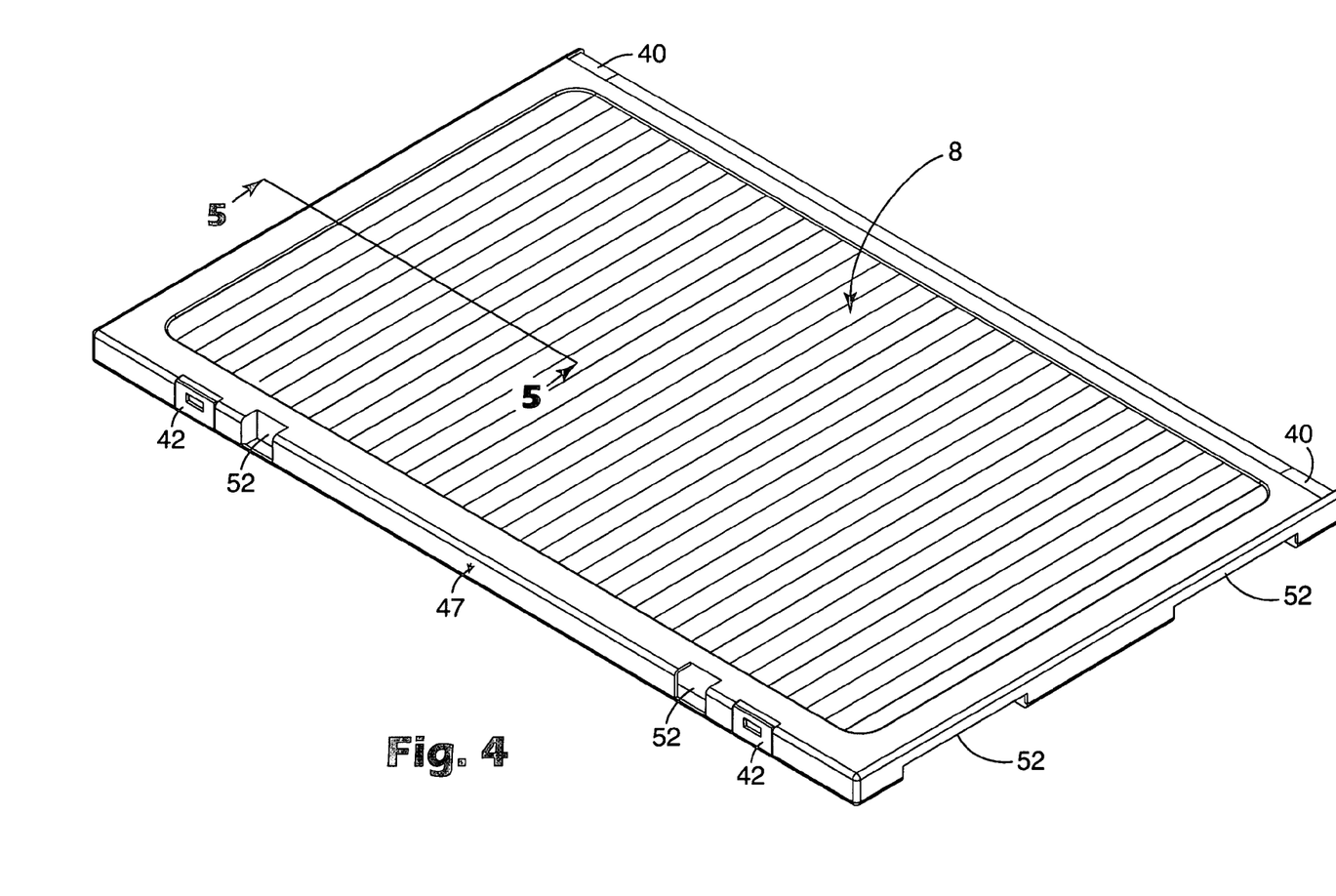
FIG. 4 is a perspective view showing the filter installed in a closed filter frame.
Figure 5:
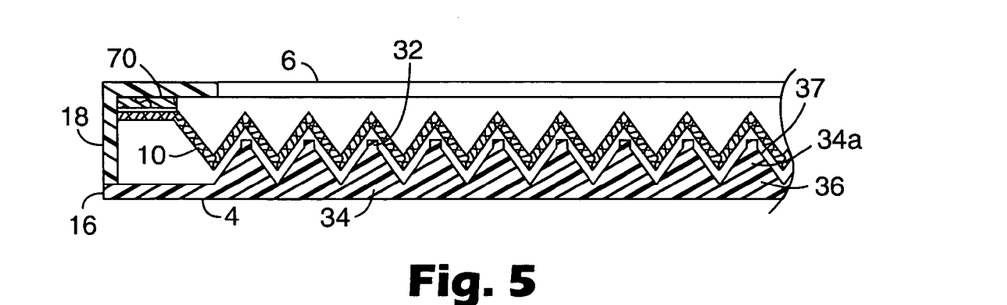
FIG. 5 is a sectional view taken along line 5—5 of FIG. 4.

To install the filter 8 into the frame 2, the frame 2 is placed on a surface so that the base 4 is beneath the cover 6. The frame 2 is then opened as shown in FIG. 1 by releasing the latches 44 and pivoting the cover 6 upwardly away from the base 4. The filter 8 is then expanded by grasping the attachment members 70 and separating them such that the pleats become spaced. The filter 8 is then placed in the base 4 so that the pleats 12 mesh between the ribs 32. The holes 76 in the attachment member 70 are then placed on the protrusions 48 to attach the filter 8 to the base 4. The cover 6 is then closed to retain the filter 8 in place, and the latches 44 are re-connected to lock the cover with the base 4. Constructed in this manner, the media 10 is supported from the back which allows the dirty side of the media to be facing up when changing the filter 8, thereby resulting in less mess. The filter 8 is removed from the frame 2 by reversing the above steps.

It will be recognized that the filter 8 may be attached to the cover 6 rather than the base 4. In this manner, the ribs 32 move into the pleats 12 as the frame 2 is closed. This, however, is less desirable because the pleats may require some adjustment to properly nest with the ribs 32, and the dirty filter will be laying with the dirty side facing down during replacement. This, in turn, will produce an unwanted mess.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A filter assembly comprising:
   (a) a filter frame including:
      base,
      a cover movably connected with said base,
      a securing mechanism; and
   (b) a pleated, reversibly expandable, self-spacing filter media removably arranged in said filter frame, said filter media having a plurality of pleats each including a fold line defining a pleat tip and a pair of adjacent panels;
   wherein said securing e mechanism is arranged to retain at least one end of said filter media in said frame, said securing mechanism including projections on one of said base and said cover that mate with corresponding holes in an other of said base and said cover.

2. A filter assembly as defined in claim 1, wherein said base and said cover include corresponding first and second side edges, said base and said cover second edges being hingably connected.

3. A filter assembly as defined in claim 2, wherein said base and said cover first side edges are movable between a closed position wherein said first side edges are engaged to enclose the filter media in the frame and an open position wherein said first side edges are spaced to allow the filter media to be inserted into and removed from the frame.

4. A filter assembly as defined in claim 3, wherein said base and said cover first side edges include a latch to releasably connect said first side edges and maintain the frame in its closed condition.

5. A filter assembly as defined in claim 1, wherein said base includes a plurality of transverse ribs corresponding to the pleats in the filter media and said ribs mesh between the pleats in the filter media.

6. A filter assembly as defined in claim 5, wherein said ribs are equally spaced.

7. A filter assembly as defined in claim 6, wherein said base includes at least one longitudinal rail including spacer portions corresponding to the shape of the filter media pleats in the region of each rib.

8. A filter assembly as defined in claim 7, wherein said longitudinal rail and said ribs form a unitary grid structure.

9. A filter assembly as defined in claim 1, wherein said securing mechanism includes projections on said base that mate with corresponding holes in said cover.

10. A filter assembly as defined in claim 1, wherein said base and said cover include associated first and second ends, and further wherein said base first and second ends each include a pair of spaced projections and said cover first and second ends each include a pair of holes aligned with said projections.

11. A filter assembly as defined in claim 10, wherein said filter media defines opposing end each including an attachment member forming holes adapted to mate with respective projections on said filter frame.

12. A filter assembly as defined in claim 1, wherein said frame is formed of a synthetic plastic material.

13. A filter assembly as defined in claim 1, wherein said frame is adapted for use in a residential heating or cooling system.

14. A filter assembly as defined in claim 1, wherein said filter media comprises a nonwoven web formed of polypropylene fibers.

15. A filter assembly comprising:
(a) a filter frame including a base having a plurality of transverse, spaced ribs and at least one longitudinal rail including spacer portions, said filter frame further including a cover movably connected with said base; and
(b) a replaceable self-spacing filter media removably arranged in said filter frame having a plurality of pleats to mesh with said ribs;
wherein said spacer portions correspond to a shape of said filter media pleats.

16. A filter assembly as defined in claim 15, wherein the number of pleat openings in one face of said filter media corresponds to the number of ribs, and said filter media can be expanded and placed into said filter frame such that said pleat openings mesh with said ribs.

17. A filter assembly as defined in claim 5, wherein said filter assembly is characterized by the absence of a separate spacing structure assembled to said filter media apart from said ribs.

18. A filter assembly as defined in claim 1, wherein said filter media includes a plurality of heat set pleats, each pleat including a fold line defining a pleat tip and a pair of adjacent panels.

19. A filter assembly as defined in claim 18, wherein said heat set pleats are elastic pleats such that said filter media is characterized by elastic spring stretching and elastic spring recovery.

20. A filter assembly as defined in claim 1, wherein said filter media defines an equilibrium length that is less than a length of a base of said filter frame.

21. A filter assembly as defined in claim 1, wherein final assembly of said filter media to said filter frame is characterized by said filter media being under tension.

22. A filter assembly as defined in claim 1, wherein said filter media is configured such that when arranged to have a length corresponding with a length of said filter frame, a spacing of said pleats corresponds with a spacing of ribs within said filter frame.

23. A filter assembly as defined in claim 1, wherein said filter media is characterized by maintaining a generally uniform spacing of said pleats when said filter media is expanded beyond an equilibrium length.

24. A filter assembly as defined in claim 1, wherein said self-spacing filter media defines a fully collapsed length and said filter media is expandable to at least 500% of the fully collapsed length.

* * * * *

UNITED STATES PATENT AND TRADEMARK OFFICE
CERTIFICATE OF CORRECTION

PATENT NO. : 7,169,202 B2  
APPLICATION NO. : 10/745191  
DATED : January 30, 2007  
INVENTOR(S) : James O. Kubokawa Page 1 of 1

It is certified that error appears in the above-identified patent and that said Letters Patent is hereby corrected as shown below:

Column 8,
Claim 1, Line 57, before "base," insert --a--.

Column 8,
Claim 1, Line 65, before "mechanism" delete "e".

Signed and Sealed this

Seventeenth Day of April, 2007

JON W. DUDAS
*Director of the United States Patent and Trademark Office*